United States Patent
Barker et al.

(10) Patent No.: US 7,524,584 B2
(45) Date of Patent: Apr. 28, 2009

(54) ELECTRODE ACTIVE MATERIAL FOR A SECONDARY ELECTROCHEMICAL CELL

(75) Inventors: Jeremy Barker, Shepton-Under-Wychwood (GB); Paul Burns, Enniskillen (GB); Aiden Bryan, Newtonabbey (GB); Richard Gover, Worcestershire (GB)

(73) Assignee: Valence Technology, Inc., Las Vegas, NV (US)

( * ) Notice: Subject to any disclaimer, the term of this patent is extended or adjusted under 35 U.S.C. 154(b) by 88 days.

(21) Appl. No.: 11/531,824

(22) Filed: Sep. 14, 2006

(65) Prior Publication Data

US 2007/0009800 A1 Jan. 11, 2007

(51) Int. Cl.
*H01M 4/58* (2006.01)
(52) U.S. Cl. ............. 429/231.5; 429/231.9; 429/231.95
(58) Field of Classification Search ............. 429/231.1, 429/231.2, 231.3, 231.5, 231.9, 231.95
See application file for complete search history.

(56) References Cited

U.S. PATENT DOCUMENTS

| | | |
|---|---|---|
| 3,736,184 A | 5/1973 | Dey et al. |
| 4,009,092 A | 2/1977 | Taylor |
| 4,049,891 A | 9/1977 | Hong et al. |
| 4,098,687 A | 7/1978 | Yang |
| 4,194,062 A | 3/1980 | Carides et al. |
| 4,260,668 A | 4/1981 | Lecerf et al. |
| 4,434,216 A | 2/1984 | Joshi et al. |
| 4,464,447 A | 8/1984 | Lazzari et al. |
| 4,477,541 A | 10/1984 | Fraioli |
| 4,512,905 A | 4/1985 | Clearfield et al. |
| 4,668,595 A | 5/1987 | Yoshino et al. |
| 4,683,181 A | 7/1987 | Armand et al. |
| 4,690,877 A | 9/1987 | Gabano et al. |
| 4,707,422 A | 11/1987 | deNeufville et al. |
| 4,792,504 A | 12/1988 | Schwab et al. |
| 4,803,137 A | 2/1989 | Miyazaki et al. |
| 4,830,939 A | 5/1989 | Lee et al. |
| 4,925,752 A | 5/1990 | Fauteux et al. |
| 4,935,317 A | 6/1990 | Fauteux et al. |
| 4,985,317 A | 1/1991 | Adachi et al. |
| 4,990,413 A | 2/1991 | Lee et al. |
| 5,011,501 A | 4/1991 | Shackle et al. |
| 5,028,500 A | 7/1991 | Fong et al. |
| 5,037,712 A | 8/1991 | Shackle et al. |
| 5,130,211 A | 7/1992 | Wilkinson et al. |
| 5,232,794 A | 8/1993 | Krumpelt et al. |

(Continued)

FOREIGN PATENT DOCUMENTS

EP    0 680 106 A1    11/1995

(Continued)

OTHER PUBLICATIONS

Andersson, A., et al., "Thermal Stability of $LiFePO_4$ - - - based Cathodes", (2000), Electrochemical and Solid-State Letters, 3 (2), pp. 66-68.

(Continued)

*Primary Examiner*—Stephen J. Kalafut
(74) *Attorney, Agent, or Firm*—Cynthia S. Kovacevic; Roger A. Williams

(57) ABSTRACT

The invention provides a novel polyanion-based electrode active material for use in a secondary or rechargeable electrochemical cell having a first electrode, a second electrode and an electrolyte.

24 Claims, 4 Drawing Sheets

U.S. PATENT DOCUMENTS

| | | | |
|---|---|---|---|
| 5,262,253 | A | 11/1993 | Golovin |
| 5,262,548 | A | 11/1993 | Barone |
| 5,296,436 | A | 3/1994 | Bortinger |
| 5,300,373 | A | 4/1994 | Shackle |
| 5,326,653 | A | 7/1994 | Chang |
| 5,399,447 | A | 3/1995 | Chaloner-Gill et al. |
| 5,411,820 | A | 5/1995 | Chaloner-Gill |
| 5,418,090 | A | 5/1995 | Koksbang et al. |
| 5,418,091 | A | 5/1995 | Gozdz et al. |
| 5,435,054 | A | 7/1995 | Tonder et al. |
| 5,456,000 | A | 10/1995 | Gozdz et al. |
| 5,460,904 | A | 10/1995 | Gozdz et al. |
| 5,463,179 | A | 10/1995 | Chaloner-Gill et al. |
| 5,482,795 | A | 1/1996 | Chaloner-Gill |
| 5,508,130 | A | 4/1996 | Golovin |
| 5,514,490 | A | 5/1996 | Chen et al. |
| 5,538,814 | A | 7/1996 | Kamauchi et al. |
| 5,540,741 | A | 7/1996 | Gozdz et al. |
| 5,541,020 | A | 7/1996 | Golovin et al. |
| 5,620,810 | A | 4/1997 | Golovin et al. |
| 5,643,695 | A | 7/1997 | Barker et al. |
| 5,660,948 | A | 8/1997 | Barker |
| 5,674,642 | A * | 10/1997 | Le et al. .................. 429/231.2 |
| 5,695,893 | A | 12/1997 | Arai et al. |
| 5,700,298 | A | 12/1997 | Shi et al. |
| 5,712,059 | A | 1/1998 | Barker et al. |
| 5,721,070 | A | 2/1998 | Shackle |
| 5,804,335 | A | 9/1998 | Kamauchi et al. |
| 5,830,602 | A | 11/1998 | Barker et al. |
| 5,851,504 | A | 12/1998 | Barker et al. |
| 5,869,207 | A | 2/1999 | Saidi et al. |
| 5,871,866 | A | 2/1999 | Barker et al. |
| 5,910,382 | A | 6/1999 | Goodenough et al. |
| 6,004,697 | A | 12/1999 | Thackeray et al. |
| 6,017,654 | A | 1/2000 | Kumta et al. |
| 6,020,087 | A | 2/2000 | Gao |
| 6,103,419 | A | 8/2000 | Saidi et al. |
| 6,136,472 | A | 10/2000 | Barker et al. |
| 6,153,333 | A | 11/2000 | Barker |
| 6,183,718 | B1 | 2/2001 | Barker et al. |
| 6,277,521 | B1 | 8/2001 | Gao et al. |
| 6,306,215 | B1 | 10/2001 | Larkin |
| 6,387,568 | B1 | 5/2002 | Barker et al. |
| 6,403,263 | B1 | 6/2002 | Roach |
| 6,432,581 | B1 | 8/2002 | Amatucci et al. |
| 6,514,640 | B1 | 2/2003 | Armand et al. |
| 6,777,132 | B2 | 8/2004 | Barker et al. |
| 6,872,492 | B2 | 3/2005 | Barker et al. |
| 6,942,948 | B2 | 9/2005 | Takehara et al. |
| 6,986,968 | B2 | 1/2006 | Hong et al. |
| 2001/0055718 | A1 | 12/2001 | Li et al. |
| 2003/0190527 | A1 | 10/2003 | Pugh et al. |
| 2003/0190528 | A1 | 10/2003 | Saidi et al. |
| 2005/0164084 | A1 | 7/2005 | Adamson et al. |
| 2005/0181283 | A1* | 8/2005 | Pugh et al. ............. 429/231.95 |
| 2006/0014078 | A1 | 1/2006 | Swoyer et al. |

FOREIGN PATENT DOCUMENTS

| | | | |
|---|---|---|---|
| EP | 0 849 817 | A1 | 6/1998 |
| EP | 1 049 182 | A2 | 11/2000 |
| EP | 1 093 172 | A1 | 4/2001 |
| JP | 61 263069 | A1 | 11/1986 |
| JP | 06 251764 | A1 | 9/1994 |
| JP | 09 171827 | A1 | 6/1997 |
| JP | 2001 52733 | A1 | 2/2001 |
| JP | 2001 85010 | A1 | 3/2001 |
| WO | WO 98/12761 | A1 | 3/1998 |
| WO | WO 99/30378 | A1 | 6/1999 |
| WO | WO 00/01024 | A1 | 1/2000 |
| WO | WO 00/31812 | A1 | 6/2000 |
| WO | WO 00/57505 | A1 | 9/2000 |
| WO | WO 01/13443 | A3 | 2/2001 |
| WO | WO 01/53198 | A1 | 7/2001 |
| WO | WO 01/54212 | A1 | 7/2001 |
| WO | WO 01/84655 | A1 | 11/2001 |
| WO | WO 02/44084 | A1 | 6/2002 |
| WO | WO 02/097907 | A2 | 12/2002 |

OTHER PUBLICATIONS

Amine, K., et al., "Olivine $LiCoPO_4$ as 4.8 V Electrode Material for Lithium Batteries", (2000), Electrochemical and Solid-State Letters, 3(4), pp. 178-179.

Kirkby, et al., "Crystal Structure of Potassium Aluminum Fluoride Phosphate $KA_1FPO_4$", Zeitschrift fur Kristallographie 956 (1995).

Nagornyi et al., "Preparation and Structure of the New Fluoride Phosphate $Na_5CrF_2(PO_4)_2$", Russian Journal of Inorganic Chemistry 35, 470, (1990).

Arlt, et al., "$Na_5AlF_2(PO_4)_2$ : Darstellung, Kristallstrukturund Ionenleitfahigkeit", Z anorg. Allg. Chem. 547, 179 (1987).

www.webmineral.com/data/Amblygonite.shtml.

www.webmineral.com/data/Lacroixite.shtml.

www.webmineral.com/data/Montebrasite.shtml.

www.webmineral.com/data/Tavorite.shtml.

www.webmineral.com/data/Griphite.shtml.

International Search Report for PCT/US97/15544, (Jan. 1998).

Rangan et al., "New Titanium-Vanadium Phosphates of Nasicon and Langbeinite Structures, and Differences Between the Two Structures Toward Deintercalation of Alkali Metal", Journal of Solid State Chemistry, 109, (1994) pp. 116-121.

Delmas et al., "The Nasicon-Type Titanium Phosphates $ATi_2(PO_4)_3$(A=Li, Na) as Electrode Materials", Solid State Ionics (1988) 28-30 pp. 419-423.

Hagenmuller et al., "Intercalation in 3D-Skeleton Structures: Ionic and Electronic Features", Material Resources Society Symposium Proc., vol. 210 (1991) pp. 323-334.

Chemical Abstracts Service, (1997), XP 2048304.

Padhi et al., "Lithium Intercalation into Nasicon-Type Mixed Phosphates: . . . and $Li_2FeTi(PO_4)_3$", $37^{th}$ Power Sources Conference, Cherry Hill, New Jersey; Conference Date: Jun. 17-20, 1996, published Oct. 15, 1996.

Sisler et al., "Chemistry A Systematic Approach", Oxford University Press, p. 746, 1980.

Gopalakrishnan et al., "$V_2(PO_4)_3$: A Novel Nasicon-Type Vanadium Phosphate Synthesized by Oxidative Deintercalation of Sodium From $Na_3V_2(PO_4)_3$", Chemistry of Materials, vol. 4, No. 4, Jul./Aug. 1992, pp. 745-747.

Delmas et al., "The Chemical Short Circuit Method, An Improvement in the Intercalation-Deintercalation Techniques", Materials Research Bulletin, vol. 23, 1988, pp. 65-72.

Ivanov-Schitz et al., "Electrical and Interfacial Properties of a $Li_3Fe_2(PO_4)_3$ Single Crystal With Silver Electrodes", Solid State Ionics, 91, (1996), pp. 93-99.

Cretin et al., "Study of $Li_{1+x}Al_xTi_{2-x}(PO_4)_3$ for Li + Potentiometric Sensors", Journal of the European Ceramic Society 15, (1995), pp. 1149-1156.

Chemical Abstracts Services, (1995) XP 2048305.

Patent Abstracts of Japan (1994) vol. 18, No. 64, (Abstract for JP 06251764).

Okada et al., "$Fe_2(SO_4)_3$ as a Cathode Material For Rechargeable Lithium Batteries", Center for Materials Science & Engineering, University of Texas, Austin, Texas, (no date of publication).

Adachi et al., "Lithium Ion Conductive Solid Electrolyte", Chemical Abstracts 112 129692 (1981).

Delmas et al., "A Nasicon-Type Phase As Intercalation Electrode: Sodium Titanium Phosphate $[NaTi_2(PO_4)_3]$", Material Resources Bulletin (1987).

Nanjundaswamy et al., "Synthesis, Redox Potential Evaluation and Electrochemical Characteristics of Nasicon-Related 3D Framework Compounds", Solid State Ionics 92, (1996) pp. 1-10.

Nadiri, "Lithium Intercalation in Lithium Titanium Phosphate $[LiTi_2(PO_4)_3]$", C.R. Acad. Sci., Ser. 2 (1987), 304 (9), pp. 415-418 (no month available).

Cotton et al., "Advanced Inorganic Chemistry, 3rd Edition", Interscience Publishers, pp. 864-868 (no month available).

Linden, "Handbook of Batteries, 2nd Edition", McGraw-Hill, Inc. pp. 36.4-36.9.

Bykov et al., "Superionic Conductors $Li_3M_2(PO_4)_3$ (M=Fe, Sc, Cr): Synthesis, Structure and Electrophysical Properties", Solid State Ionics, vol. 38 (1990) pp. 31-52 (no month available).

Genkina et al., "Crystal Structure of Synthetic Tavorite $LiFe[PO_4](OH,F)$", Kristallografiya (1984), 29 (1) 50-5.

Genkina et al., "Phase Formation and Crystallochemistry of Iron Phosphates . . .", Izv. Akad. Nauk SSR, Neorg. Mater. (1988), 24 (7), pp. 1158-1162, abstract only.

Dutreilh et al., "Synthesis and Crystal Structure of a New Lithium Nickel Fluorophosphates $Li_2[NiF(PO_4)]$ . . . ", Journal of Solid State Chemistry, 142, pp. 1-5 (1999).

M-T Averbuch-Pouchot et al., "Topics in Phosphate Chemistry", World Scientific Publishing Co., Singapore (1996), pp. 106-119.

Loiseau et al., "$NH_4FePO_4F$: Structural Study and Magnetic Properties", Journal of Solid State Chemistry III, pp. 390-396 (1994).

LeMeins et al., "Phase Transitions in the $Na_3M_2(PO_4)F_3$ Family ($M=Al^{3+}$, $V^{3+}$, $Cr^{3+}$ $Fe^{3+}$, $Ga^{3+}$): Synthesis, Thermal, Structural, and Magnetic Studies", Journal of Solid State Chemistry 148, pp. 260-277 (1999).

Moss et al., "On the X-Ray Identification of Amblygonite and Montebrasite", Mineralogical Magazine, vol. 37, No. 287, pp. 414-422 (1969).

Goodenough et al., "Phospho-Olivines as Positive Electrode Materials for Rechargeable Lithium Batteries", Journal of the Electrochemical Society, vol. 144, No. 4, pp. 1188-1194 (1997).

Yakubovich et al., "The Mixed Anionic Framework in the Structure of $Na_2[MnF(PO_4)]$", Acta Crystallographica Section C, Crystal Structure Communications, vol. C53, Part 4, pp. 395-397 (1997).

LeMeins et al., "Ionic Conductivity of Crystalline and Amorphous $Na_3Al_2(PO_4)_2F_3$", Solid State Ionics Diffusion & Reactions, vol. 111, pp. 67-75 (1998).

PCT International Search Report PCT/US01/08132 dated Sep. 27, 2001.

Reddy and Hossain (Editor Linden), "Rechargeable Lithium Batteries (Ambient Temperature)", Handbook of Batteries Third Edition, pp. 34.1-34.62.

Rinaldi et al., "The Crystal Structure of Griphite, Complex Phosphate Not a Garnetoid" Bulletin de Mineralogie, vol. 101(5-6), pp. 453-457 (1978).

International Search Report, PCT/US07/77173 dated Jul. 2, 2008.

* cited by examiner

ELECTRODE ACTIVE MATERIAL FOR A SECONDARY ELECTROCHEMICAL CELL

FIELD OF THE INVENTION

This invention relates to a novel electrode active material intended for use in a secondary or rechargeable electrochemical cell.

BACKGROUND OF THE INVENTION

A battery consists of one or more electrochemical cells, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Such batteries generally include an electrochemically active material having a crystal lattice structure or framework from which ions can be extracted and subsequently reinserted, and/or permit ions to be inserted or intercalated and subsequently extracted.

SUMMARY OF THE INVENTION

The present invention provides a novel electrode active material represented by the general formula:

$$A_{a+b}M_cL_{1-d}Z_{e+b+(V^L)(d)},$$

wherein:
(i) A is selected from the group consisting of elements from Group I of the Periodic Table, and mixtures thereof;
(ii) M includes at least one redox active element;
(iii) L is selected from the group consisting of $X'[O_{4-x},Y'_x]$, $X'[O_{4-y}, Y'_{2y}]$, $X''S_4$, $[X_z''',X'_{1-z}]O_4$, and mixtures thereof, wherein:
  (a) X' and X''' are each independently selected from the group consisting of P, As, Sb, Si, Ge, V, S, and mixtures thereof;
  (b) X'' is selected from the group consisting of P, As, Sb, Si, Ge, V, and mixtures thereof;
  (c) Y' is selected from the group consisting of halogens selected from Group 17 of the Periodic Table, S, N, and mixtures thereof;
  (d) $0 \leq x \leq 3$, $0 \leq y \leq 2$, $0 \leq z \leq 1$;
(iv) Z is selected from the group consisting of a hydroxyl (OH), halogens selected from Group 17 of the Periodic Table, and mixtures thereof, and $V^L$ is the oxidation state of composition variable L; and
(v) a, b and $e \geq 0$, $0 < d < 1$, and $c > 0$.

wherein A, M, L, Z, a, b, c, d, e, x, y, and z are selected so as to maintain electroneutrality of the electrode active material in its nascent state.

The present invention also provides a secondary electrochemical cell or battery containing the novel electrode active material of the present invention.

DETAILED DESCRIPTION OF THE PREFERRED EMBODIMENTS

Figure 1:
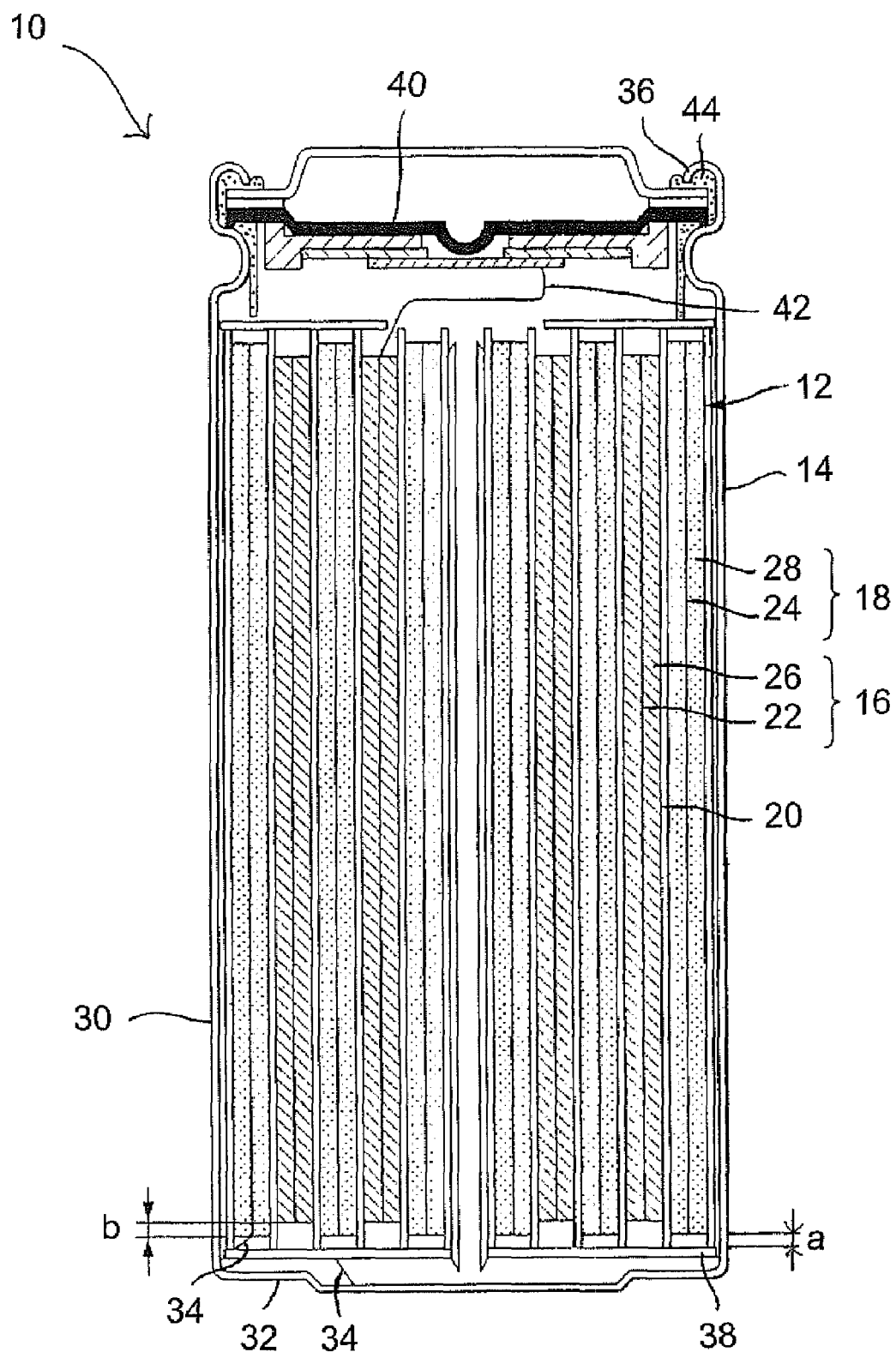
FIG. 1 is a schematic cross-sectional diagram illustrating the structure of an embodiment of an electrochemical cell of the present invention.

It has been found that the novel electrode active material of this invention afford benefits over such materials among those known in the art. Such benefits include, without limitation, one or more of reduced mass (and therefore increased theoretical specific capacity), increased operating voltage, increased capacity, enhanced cycling capability, enhanced reversibility, enhanced ionic conductivity, enhanced electrical conductivity, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The present invention provides an electrode active material represented by the general formula (I):

$$A_{a+b}M_cL_{1-d}Z_{e+b+(V^L)(d)}. \qquad (I)$$

The composition variables A, M, L and Z, as defined herein, as well as their corresponding stoichiometric values, are selected so as to maintain electroneutrality of the electrode active material in its nascent or as-synthesized state, and specifically to satisfy the formula (II)

$$a+V^M(c)=V^L+e, \qquad (II)$$

wherein $V^M$ is the oxidation state for composition variable M, and $V^L$ is the oxidation state for composition variable L. The stoichiometric values of one or more elements of the composition may take on non-integer values.

For all embodiments described herein, composition variable A is selected from the group consisting of elements from Group I of the Periodic Table, and mixtures thereof (e.g. $A_a = A_{a-a'}A'_{a'}$, wherein A and A' are each selected from the group consisting of elements from Group I of the Periodic Table and are different from one another, and a'<a). As referred to herein, "Group" refers to the Group numbers (i.e., columns) of the Periodic Table as defined in the current IUPAC Periodic Table. (See, e.g., U.S. Pat. No. 6,136,472 to Barker et al., incorporated by reference herein.) In addition, the recitation of a genus of elements, materials or other components, from which an individual component or mixture of components can be selected, is intended to include all possible sub-generic combinations of the listed components, and mixtures thereof. Also, "include," and its variants, is intended to be non-limiting, such that recitation of items in a list is not to the exclusion of other like items that may also be useful in the materials, compositions, devices, and methods of this invention.

In one subembodiment, A is selected from the group consisting of Li (Lithium), Na (Sodium), K (Potassium), and mixtures thereof. In another subembodiment, A selected from the group consisting of Na, and a mixture of Na with K, and a mixture of Na with Li. In one subembodiment, A is Li.

A sufficient quantity (a) of composition variable A should be present so as to allow all of the "redox active" elements of composition variable M (as defined herein below) to undergo oxidation/reduction. In one embodiment, 0≦a≦6. In another embodiment, 0<a≦4. In another embodiment, 1≦a≦2. Unless otherwise specified, a variable described herein algebraically as equal to ("="), less than or equal to ("≦"), or greater than or equal to ("≧") a number is intended to subsume values or ranges of values about equal or functionally equivalent to the number.

Removal of an amount (a) of composition variable A from the electrode active material is accompanied by a change in oxidation state of at least one of the "redox active" elements in the active material, as defined herein below. The amount of redox active material available for oxidation/reduction in the active material determines the amount (a) of composition variable A that may be removed. Such concepts are, in general application, known in the art, e.g., as disclosed in U.S. Pat. No. 4,477,541 to Fraioli and U.S. Pat. No. 6,136,472 to Barker, et al., both of which are incorporated by reference herein.

In general, the amount (a) of composition variable A in the active material varies during charge/discharge. Where the active materials of the present invention are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (a") of composition variable A is removed from the active material as described above. The resulting structure, containing less amount of composition variable A (i.e., a-a") than in the nascent or as-prepared state, and at least one of the redox active components having a higher oxidation state than in the as-prepared state, while essentially maintaining the original stoichiometric values of the remaining components (e.g. A, M, L and Z). The active materials of this invention include such materials in their nascent state (i.e., as manufactured prior to inclusion in an electrode) and materials formed during operation of the battery (i.e., by insertion or removal of A).

For all embodiments described herein, composition variable A may be partially substituted by composition variable Z (described herein below) in equal stoichiometric amounts. In one embodiment, 0≦b≦2. In another embodiment, 0<b≦1. In yet another embodiment, 0.05≦b≦0.75.

Referring again to general formula (I), in all embodiments described herein, composition variable M includes at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell. Furthermore, for all embodiments described herein, c>0.

Redox active elements useful herein with respect to composition variable M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. For each embodiment described herein, M may comprise a mixture of oxidation states for a particular element (e.g., M=$Mn^{2+}Mn^{4+}$).

In one embodiment, composition variable M is a redox active element. In one subembodiment, M is a redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, composition variable M includes one or more redox active elements and one or more non-redox active elements. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, M=$MI_n MII_o$, wherein 0<o+n≦c and each of o and n is greater than zero (o,n>0), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts. "Isocharge substitution" refers to a substitution of one element on a given crystallographic site with an element having the same oxidation state (e.g. substitution of $Fe^{2+}$ with $Mg^{2+}$). "Aliovalent substitution" refers to a substitution of one element on a given crystallographic site with an element having a different oxidation state (e.g. substitution of $Fe^{2+}$ with $Li^+$).

For all embodiments described herein where MI is partially substituted by MII by isocharge substitution, MI may be substituted by an equal stoichiometric amount of MII, whereby M=$MI_{n-o}MII_o$. Where MI is partially substituted by MII by isocharge substitution and the stoichiometric amount of MI is not equal to the amount of MII, whereby M=$MI_{n-q}MII_o$, o≠q and 0<q<o, then the stoichiometric amount of one or more of the other components (e.g. A, L and Z) in the active material must be adjusted in order to maintain electroneutrality.

For all embodiments described herein where MI is partially substituted by MII by aliovalent substitution and an equal amount of MI is substituted by an equal amount of MII, whereby M=$MI_{n-o}MII_o$, then the stoichiometric amount of one or more of the other components (e.g. A, L and Z) in the active material must be adjusted in order to maintain electroneutrality. However, MI may be partially substituted by MII by aliovalent substitution by substituting an "oxidatively" equivalent amount of MII for MI, whereby $$M = MI_{n-\frac{o}{VMI}} MII_{\frac{o}{VMII}},$$

wherein $V^{MI}$ is the oxidation state of MI, and $V^{MII}$ is the oxidation state of MII.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^2$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is a 3+ oxidation state redox active element selected from the group specified immediately above, and MII is selected from the group consisting of alkali metals, $Cu^{1+}$, $Ag^{1+}$ and mixtures thereof.

In another embodiment, $M=M1_q M2_r M3_s$, wherein:

(vi) M1 is a redox active element with a 2+ oxidation state;

(vii) M2 is selected from the group consisting of redox and non-redox active elements with a 1+ oxidation state;

(viii) M3 is selected from the group consisting of redox and non-redox active elements with a 3+ or greater oxidation state; and (ix) at least one of q, r and s is greater than 0, $0<q+r+s\leq c$, and at least one of M1, M2, and M3 is redox active.

In one subembodiment, q, r and s>0. In another subembodiment, M1 is substituted by an equal amount of M2 and/or M3, whereby $q=q-(r+s)$. In this subembodiment, then the stoichiometric amount of one or more of the other components (e.g. A, L and Z) in the active material may be adjusted in order to maintain electroneutrality.

In another subembodiment, M1 is substituted by an "oxidatively" equivalent amount of M2 and/or M3, whereby $$M = M1_{q-\frac{r}{V^{M1}}-\frac{s}{V^{M1}}} M2_{\frac{r}{V^{M2}}} M3_{\frac{s}{V^{M3}}},$$

wherein $V^{M1}$ is the oxidation state of M1, $V^{M2}$ is the oxidation state of M2, and $V^{M3}$ is the oxidation state of M3, wherein at least one of q, r and s is greater than 0. In one subembodiment, q, r and s are each greater than 0 (q,r,s>0).

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$, and mixtures thereof; and M3 is selected from the group consisting of $Sc^{3+}$, $Y^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In all embodiments described herein, composition variable L is a polyanion selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:

(a) X' and X''' are each independently selected from the group consisting of P, As, Sb, Si, Ge, V, S, and mixtures thereof;

(b) X'' is selected from the group consisting of P, As, Sb, Si, Ge, V, and mixtures thereof;

(c) Y' is selected from the group consisting of halogens selected from Group 17 of the Periodic Table, S, N, and mixtures thereof; and (d) $0\leq x\leq 3$, $0\leq y\leq 2$, and $0\leq z\leq 1$.

In one subembodiment, L is selected from the group consisting of $PO_4$, $SiO_4$, $GeO_4$, $VO_4$, $AsO_4$, $SbO_4$, $SO_4$, and mixtures thereof. In one particular subembodiment, composition variable L contains $PO_4$ with another polyanion selected from the group consisting of $SiO_4$, $GeO_4$, $VO_4$, $AsO_4$, $SbO_4$ and $SO_4$. In one subembodiment, composition variable L includes about 80% or more phosphate ($PO_4$) and up to about 20% of another polyanion selected from the group consisting of $SiO_4$, $GeO_4$, $VO_4$, $AsO_4$, $SbO_4$ and $SO_4$. In another subembodiment, $L=PO_4$.

In another subembodiment, L is selected from the group consisting of $X'[O_{4-x},Y'_x]$, $X'[O_{4-y},Y'_{2y}]$, and mixtures thereof, $0<x\leq 3$ and $0<y\leq 2$, wherein a portion of the oxygen (O) in the L composition variable is substituted with a halogen, S, N, or a mixture thereof.

In all embodiments described herein, composition variable Z is selected from the group consisting of OH (Hydroxyl), halogens selected from Group 17 of the Periodic Table, and mixtures thereof. In one subembodiment, Z is selected from the group consisting of OH, F (Fluorine), Cl (Chlorine), Br (Bromine), and mixtures thereof. In another subembodiment, Z is OH. In another embodiment, Z is F. In another subembodiment, Z is a mixture of F with one of OH, Cl, and Br. For all embodiments described herein, $0<d<1$.

In one particular embodiment of the present invention, the electrode active material is represented by the general formula (III):

$$Li_aM_cL_{1-d}Z_{e+d(V^L)}, \qquad (III)$$

wherein:
(x) $0<a\leq 4$, $0<c\leq 2$, $0<d<1$ and $0\leq e\leq 1$;
(xi) composition variables M and Z are as described herein above;
(xii) L is $XO_4$, wherein X is selected from the group consisting of P, As, Sb, Si, Ge, V, S and mixtures thereof;
(xiii) $V^L$ is the oxidation state of composition variable L; and
(xiv) M, L, Z, a, c, d and e are selected so as to maintain electroneutrality of the electrode active material in its nascent state.

In another embodiment, the electrode active material is represented by the general formula (IV):

$$Li_aM_c(PO_4)_{1-d}Z_{e+3d}, \qquad (IV)$$

wherein:
(xv) $0<a\leq 3$, $0<c\leq 2$, $0<d<1$, and $0\leq e\leq 6$;
(xvi) composition variables M and Z are as described herein above; and
(xvii) M, Z, a, c, d and e are selected so as to maintain electroneutrality of the electrode active material in its nascent state.

In another embodiment, the electrode active material is represented by the general formula (V):

$$Li_aV_c(PO_4)_{1-d}F_{e+3d}, \qquad (V)$$

wherein:
(xviii) $0<a\leq 5$, $0<c\leq 1$, $0<d<1$, and $0\leq e\leq a$; and
(xix) a, c, d and e are selected so as to maintain electroneutrality of the electrode active material in its nascent state.

Non-limiting examples of active materials represented by general formulas (I) and (III) through (V) include the following: $Li_2Fe(PO_4)_{0.9}F_{1.3}$; $Li_2Co(PO_4)_{0.9}F_{1.3}$; $Li_2Mn(PO_4)_{0.9}F_{1.3}$; $LiV(PO_4)_{0.9}F_{1.3}$; $LiV(PO_4)_{0.9}F_{1.3}$; $LiV(PO_4)_{0.8}F_{1.6}$; $NaV(PO_4)_{0.8}Cl_{1.6}$; $Li_2Mn_{0.8}Fe_{0.2}(PO_4)_{0.8}F_{1.6}$; $Li_2Mn_{0.9}Fe_{0.8}(PO_4)_{0.9}F_{1.3}$; $Li_2Fe_{0.9}Mg_{0.1}(PO_4)_{0.9}F_{1.3}$; $Li_2Fe_{0.8}Mg_{0.2}(PO_4)_{0.8}F_{1.6}$; $LiFe_{0.95}Mg_{0.05}(PO_4)_{0.6}F_{2.2}$; $Li_{2.025}Co_{0.85}Fe_{0.05}Al_{0.025}Mg_{0.05}(PO_4)_{0.8}F_{1.6}$; $Li_{2.025}Co_{0.80}Fe_{0.10}Al_{0.025}Mg_{0.05}(PO_4)_{0.9}F_{1.3}$; $Li_{2.025}Co_{0.75}Fe_{0.15}Al_{0.025}Mg_{0.05}(PO_4)_{0.7}F_{1.9}$; $Li_{2.025}Co_{0.7}(Fe_{0.4}Mn_{0.6})_{0.2}Al_{0.025}Mg_{0.05}(PO_4)_{0.9}F_{1.3}$; $Li_2Co_{0.8}Fe_{0.1}Ti_{0.025}Mg_{0.05}(PO_4)_{0.9}F_{1.3}$; $Li_{2.025}Co_{0.8}Fe_{0.1}Ti_{0.025}Al_{0.025}(PO_4)_{0.8}F_{1.6}$; $Li_2Co_{0.825}Fe_{0.1}Ti_{0.025}Mg_{0.025}(PO_4)_{0.9}F_{1.3}$; $LiCo_{0.85}Fe_{0.075}Ti_{0.025}Mg_{0.025}(PO_4)_{0.9}F_{1.3}$. A particularly preferred active material is $LiV(PO_4)_{1-d}F_{1+3d}$, wherein $0<d<0.2$.

Methods of making the electrode active materials described by general formulas (I) and (III) through (V) are known by those skilled in the art, and such methods are described are described in: WO 01/54212 to Barker et al., published Jul. 26, 2001; International Publication No. WO 98/12761 to Barker et al., published Mar. 26, 1998; WO 00/01024 to Barker et al., published Jan. 6, 2000; WO 00/31812 to Barker et al., published Jun. 2, 2000; WO 00/57505 to Barker et al., published Sep. 28, 2000; WO 02/44084 to Barker et al., published Jun. 6, 2002; WO 03/085757 to Thei et al., published Oct. 16, 2003; WO 03/085771 to Thei et al., published Oct. 16, 2003; WO 03/088383 to Thei et al., published Oct. 23, 2003; U.S. Pat. No. 6,528,033 to Barker et al., issued Mar. 4, 2003; U.S. Pat. No. 6,387,568 to Barker et al., issued May 14, 2002; U.S. Publication No. 2003/0027049 to Barker et al., published Feb. 2, 2003; U.S. Publication No. 2002/0192553 to Barker et al., published Dec. 19, 2002; U.S. Publication No. 2003/0170542 to Barker at al., published Sep. 11, 2003; and U.S. Publication No. 2003/1029492 to Barker et al., published Jul. 10, 2003; the teachings of all of which are incorporated herein by reference.

Active materials of general formulas (I) and (III) through (V) are readily synthesized by reacting starting materials in a solid state reaction, with or without simultaneous oxidation or reduction of the metal species involved. Sources of composition variable A include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of composition variable M include salts or compounds of any of the transition metals, alkaline earth metals, or lanthanide metals, as well as of non-transition metals such as aluminum, gallium, indium, thallium, tin, lead, and bismuth. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The elements or elements comprising composition variable M in the starting material may have any oxidation state, depending the oxidation state required in the desired product and the oxidizing or reducing conditions contemplated, as discussed below. The metal sources are chosen so that at least one metal in the final reaction product is capable of being in an oxidation state higher than it is in the reaction product.

Sources for composition variable L are provided by a number of salts or compounds containing positively charged cations in addition to the source of the polyanion or polyanions comprising composition variable L. Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate or other $XO_4$ species, starting materials are preferably provided in particulate or powder form. Hydrates of any of the above may be used, as can mixtures of the above.

Sources of composition variable Z include any of a number of salts or ionic compounds of a halogen or hydroxyl. Non-limiting examples include the alkali-metal halides and hydroxides, and ammonium halides and hydroxides. Hydrates of the above compounds may also be used, as well as mixtures thereof. In particular, the mixtures may contain more than one alkali metal so that a mixed alkali metal active material will be produced in the reaction.

A starting material may provide more than one of composition variables A, M, and L and Z as is evident in the list above. In various embodiments of the invention, starting materials are provided that combine, for example, composition variable M and L, thus requiring only composition variable A and Z be added. In one embodiment, a starting material is provided that contains alkali metal, a metal, and phosphate. Combinations of starting materials providing each of the components may also be used. It is preferred to select starting materials with counterions that give rise to volatile by-products. Thus, it is desirable to choose ammonium salts, carbonates, oxides, and the like where possible. Starting materials with these counterions tend to form volatile by-products such as water, ammonia, and carbon dioxide, which can be readily removed from the reaction mixture. This concept is well illustrated in the Examples below.

The sources of composition variables A, M, L and Z, may be reacted together in the solid state while heating for a time and temperature sufficient to make a reaction product. The starting materials are provided in powder or particulate form. The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms. Exemplary times and temperatures for the reaction are given in the Examples below.

Another means for carrying out the reaction at a lower temperature is hydrothermally. In a hydrothermal reaction, the starting materials are mixed with a small amount of a liquid such as water, and placed in a pressurized bomb. The reaction temperature is limited to that which can be achieved by heating the liquid water in a continued volume creating an increased pressure, and the particular reaction vessel used.

The reaction may be carried out without redox, or if desired under reducing or oxidizing conditions. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in-situ by including in the reaction mixture a reductant that will participate in the reaction to reduce the one or more elements comprising composition variable M, but that will produce by-products that will not interfere with the active material when used later in an electrode or an electrochemical cell. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolize under the reaction conditions to produce a reducing form of carbon. A preferred source of reducing carbon is elemental carbon It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

The carbothermal reduction method of synthesis of mixed metal phosphates has been described in PCT Publication WO01/53198, Barker et al., incorporated by reference herein. The carbothermal method may be used to react starting materials in the presence of reducing carbon to form a variety of products. The carbon functions to reduce a metal ion in the starting material M source. The reducing carbon, for example in the form of elemental carbon powder, is mixed with the other starting materials and heated. For best results, the temperature should be about 400° C. or greater, and up to about 950° C. Higher temperatures may be used, but are usually not required.

The present invention also provides for batteries containing the novel electrode active material described by general formulas (I) and (III) through (V), wherein the battery includes:

(a) a first electrode (also commonly referred to as a positive electrode or cathode) which includes an active material of the present invention;

(b) a second electrode (also commonly referred to as a negative electrode or anode) which is a counter-electrode to the first electrode; and (c) an electrolyte in ion-transfer communication with the first and second electrodes.

The electrode active material of this invention may be incorporated into the first electrode, the second electrode, or both. Preferably, the electrode active material is employed in the cathode. The architecture of a battery of the present invention is selected from the group consisting of cylindrical wound designs, wound prismatic and flat-plate prismatic designs, and polymer laminate designs.

Referring to FIG. 1, in one embodiment, a novel secondary electrochemical cell 10 having an electrode active material of the present invention, includes a spirally coiled or wound electrode assembly 12 enclosed in a sealed container, preferably a rigid cylindrical casing 14 as illustrated in FIG. 1. In one subembodiment, the cell 10 is a prismatic-type cell, and the casing has a substantially rectangular cross-section (not illustrated).

Referring again to FIG. 1, the electrode assembly 12 includes: a positive electrode 16 consisting of, among other things, an electrode active material represented by general formulas (I) and (III) through (V); a counter negative electrode 18; and a separator 20 interposed between the first and second electrodes 16,18. The separator 20 is preferably an electrically insulating, ionically conductive microporous film, and composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16,18 includes a current collector 22 and 24, respectively, for providing electrical communication between the electrodes 16,18 and an external load. Each current collector 22,24 is a foil or grid of an electrically conductive metal such as iron, copper, aluminum, titanium, nickel, stainless steel, or the like, having a thickness of between 5 μm and 100 μm, preferably 5 μm and 20 μm. Optionally, the current collector may be treated with an oxide-removing agent such as a mild acid and the like, and coated with an electrically conductive coating for inhibiting the formation of electrically insulating oxides on the surface of the current collector 22,24. Examples of a suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 10 μm and 150 μm, preferably between 25 μm an 125 μm, in order to realize the optimal capacity for the cell 10. The positive electrode film 26 is composed of between 80% and 95% by weight of an electrode active material represented by general formulas (I) and (III) through (V), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. The negative electrode film 28 is composed of between 80% and 95% of an intercalation material, between 2% and 10% by weight binder, and (optionally) between 1% and 10% by of an weight electrically conductive agent.

Intercalation materials suitable herein include: transition metal oxides, metal chalcogenides, carbons or carbonaceous materials (e.g. graphite), and mixtures thereof. In one embodiment, the intercalation material is selected from the group consisting of crystalline graphite and amorphous graphite, and mixtures thereof, each such graphite having one or more of the following properties: a lattice interplane (002) d-value ($d_{(002)}$) obtained by X-ray diffraction of between 3.35 Å to 3.34 Å, inclusive (3.35 Å$\leq d_{(002)} \leq$3.34 Å), preferably 3.354 Å to 3.370 Å, inclusive (3.354 Å$\leq d_{(002)} \leq$3.370 Å; a crystallite size ($L_c$) in the c-axis direction obtained by X-ray diffraction of at least 200 Å, inclusive ($L_c \geq$200 Å), preferably between 200 Å and 1,000 Å, inclusive (200 Å$\leq L_c \leq$1,000 Å); an average particle diameter ($P_d$) of between 1 μm to 30 μm, inclusive (1 μm$\leq P_d \leq$30 μm); a specific surface (SA) area of between 0.5 m$^2$/g to 50 m$^2$/g, inclusive (0.5 m$^2$/g$\leq$SA$\leq$50 m$^2$/g); and a true density (ρ) of between 1.9 g/cm$^3$ to 2.25 g/cm$^3$, inclusive (1.9 g/cm$^3 \leq \rho \leq$2.25 g/cm$^3$).

Referring again to FIG. 1, to ensure that the electrodes 16,18 do not come into electrical contact with one another, in the event the electrodes 16,18 become offset during the winding operation during manufacture, the separator 20 "overhangs" or extends a width "a" beyond each edge of the negative electrode 18. In one embodiment, 50 μm$\leq$a$\leq$2,000 μm. To ensure alkali metal does not plate on the edges of the negative electrode 18 during charging, the negative electrode 18 "overhangs" or extends a width "b" beyond each edge of the positive electrode 16. In one embodiment, 50 μm$\leq$b$\leq$2,000 μm.

The cylindrical casing 14 includes a cylindrical body member 30 having a closed end 32 in electrical communication with the negative electrode 18 via a negative electrode lead 34, and an open end defined by crimped edge 36. In operation, the cylindrical body member 30, and more particularly the closed end 32, is electrically conductive and provides electrical communication between the negative electrode 18 and an external load (not illustrated). An insulating member 38 is interposed between the spirally coiled or wound electrode assembly 12 and the closed end 32.

A positive terminal subassembly 40 in electrical communication with the positive electrode 16 via a positive electrode lead 42 provides electrical communication between the positive electrode 16 and the external load (not illustrated). Preferably, the positive terminal subassembly 40 is adapted to sever electrical communication between the positive electrode 16 and an external load/charging device in the event of an overcharge condition (e.g. by way of positive temperature coefficient (PTC) element), elevated temperature and/or in the event of excess gas generation within the cylindrical casing 14. Suitable positive terminal assemblies 40 are disclosed in U.S. Pat. No. 6,632,572 to Iwaizono, et al., issued Oct. 14, 2003; and U.S. Pat. No. 6,667,132 to Okochi, et al., issued Dec. 23, 2003. A gasket member 44 sealingly engages the upper portion of the cylindrical body member 30 to the positive terminal subassembly 40.

A non-aqueous electrolyte (not shown) provides ionic communication between the positive electrode 16 and the negative electrode 18, by transferring ionic charge carriers between the positive electrode 16 and the negative electrode 18 during charge and discharge of the electrochemical cell 10. The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phosphoric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts include: $LiClO_4$; $LiBF_4$; $LiPF_6$; $LiAlCl_4$; $LiSbF_6$; LiSCN; LiCl; $LiCF_3SO_3$; $LiCF_3CO_2$; $Li(CF_3SO_2)_2$; $LiAsF_6$; $LiN(CF_3SO2)_2$; $LiB_{10}Cl_{10}$, lithium bis(oxalate)borate; a lithium lower aliphatic carboxylate; LiCl; LiBr; LiI; a chloroboran of lithium; lithium tetraphenylborate; lithium imides; sodium and potassium analogues of the aforementioned lithium salts; and mixtures thereof. Preferably, the electrolyte contains at least $LiPF_6$.

Figure 2:
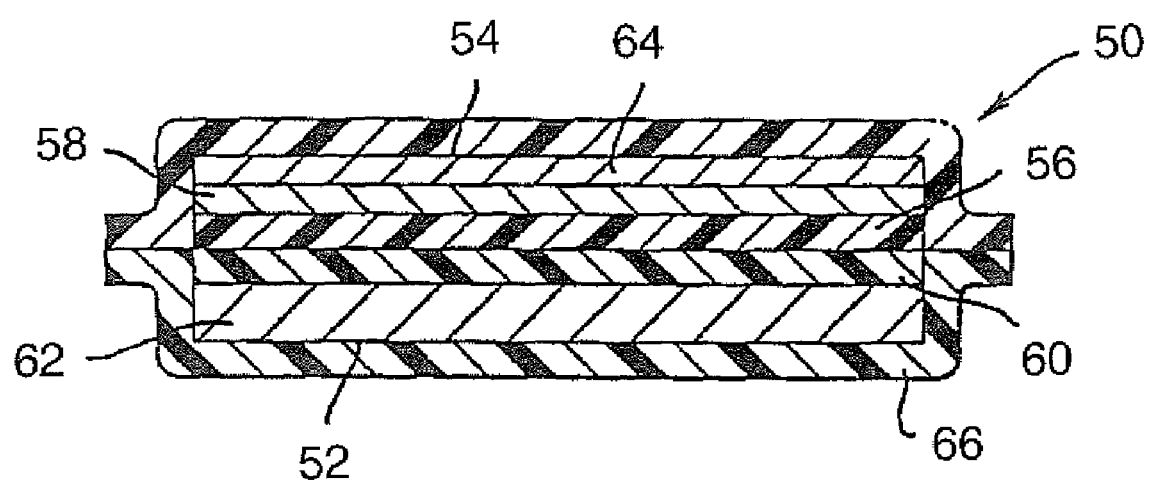
FIG. 2 is a schematic cross-sectional diagram illustrating the structure of another embodiment of an electrochemical cell of the present invention.

Referring to FIG. 2, in another embodiment, a polymer laminate-type secondary electrochemical cell 50 having an electrode active material represented by general formula (I), includes a laminated or polymer stacked cell structure, having a negative electrode 52, a positive electrode 54, and an electrolyte/separator 56 there between. The negative electrode 52 includes a current collector 60 (preferably, a copper foil or grid) in electrical communication with a negative electrode membrane or film 62; and the positive electrode 54 includes a current collector 58 (preferably, an aluminum foil or grid) in electrical communication with a positive electrode membrane or film 64. Protective bagging material 66 covers the cell and prevents infiltration of air and moisture. Such structures are disclosed in, for example, U.S. Pat. No. 4,925,752 to Fauteux et al; U.S. Pat. No. 5,011,501 to Shackle et al.; and U.S. Pat. No. 5,326,653 to Chang; all of which are incorporated by reference herein.

The relative weight proportions of the components of the positive electrode 54 are generally: about 50-90% by weight active material represented by general formulas (I) and (III) through (V); 5-30% carbon black as the electric conductive diluent; and 3-20% binder chosen to hold all particulate materials in contact with one another without degrading ionic conductivity. Stated ranges are not critical, and the amount of active material in an electrode may range from 25-95 weight percent. The negative electrode 52 includes about 50-95% by weight of a preferred intercalation material, with the balance constituted by the binder. In a preferred embodiment, the negative electrode intercalation material is graphite. For test purposes, test cells are often fabricated using lithium metal electrodes.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120-160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 16 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

Electrolyte solvents are selected to be used individually or in mixtures, and include dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof. The preferred solvents are EC/DMC, EC/DEC, EC/DPC and EC/EMC. The salt content ranges from 5% to 65% by weight, preferably from 8% to 35% by weight. One example is a mixture of EC:DMC:$LiPF_6$ in a weight ratio of about 60:30:10. Desirable solvents and salts are described in U.S. Pat. No. 5,643,695 to Barker et al. and U.S. Pat. No. 5,418,091 to Gozdz et al.

Examples of forming laminate and polymer stacked cells are disclosed in U.S. Pat. No. 4,668,595 to Yoshino et al.; U.S. Pat. No. 4,830,939 to Lee et al.; U.S. Pat. No. 4,935,317 to Fauteux et al.; U.S. Pat. No. 4,990,413 to Lee et al.; U.S. Pat. No. 4,792,504 to Schwab et al.; U.S. Pat. No. 5,037,712 to Shackle et al.; U.S. Pat. No. 5,262,253 to Golovin; U.S. Pat. No. 5,300,373 to Shackle; U.S. Pat. No. 5,435,054 to Tonder et al.; U.S. Pat. No. 5,463,179 to Chaloner-Gill et al.; U.S. Pat. No. 5,399,447 to Chaloner-Gill et al.; U.S. Pat. No. 5,482,795 to Chaloner-Gill and U.S. Pat. No. 5,411,820 to Chaloner-Gill; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. No. 5,418,091 to Gozdz; U.S. Pat. No. 5,460,904 to Gozdz; U.S. Pat. No. 5,456,000 to Gozdz et al.; and U.S. Pat. No. 5,540,741 to Gozdz et al.; each of which is incorporated herein by reference in its entirety.

The following non-limiting examples illustrate the compositions and methods of the present invention.

EXAMPLE 1

An electrode active material of the formula $Li_2Fe(PO_4)_{0.9}F_{1.3}$, representative of materials of the general formula $Li_aM_cL_{1-d}Z_{e+d(v^L)}$, is made as follows. The following sources of Li, Fe, phosphate ($PO_4$) and F are provided containing the respective elements in a molar ratio of 2:1:0.9:1.3, respectively.

| | |
|---|---|
| 0.7 mol $Li_2CO_3$ (73.9 g/mol) | 51.7 g |
| 0.5 mol $Fe_2O_3$ (159.7 g/mol) | 79.9 g |
| 0.9 mol $(NH_4)_2HPO_4$ (132 g/mol) | 118.8 g |
| 1.3 mol LiF (25.9 g/mol) | 33.7 g |
| 0.5 mol elemental carbon (12 g/mol) (100% excess) | 12 g |

The overall reaction scheme is as follows. The moles of reactants are stated in the table above.

$Li_2CO_3+(NH_4)_2HPO_4+LiF+Fe_2O_3+C\rightarrow Li_2Fe(PO_4)_{0.9}F_{1.3}+NH_3+H_2O+CO+CO_2$

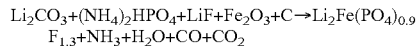

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An electrode is made with 80% of the active material, 10% of Super P conductive carbon, and 10% poly vinylidene difluoride. A cell with that electrode as the cathode and carbon intercalation anode is constructed with an electrolyte comprising 1 M $LiPF_6$ dissolved in 2:1 by weight ethylene carbonate to dimethyl carbonate.

EXAMPLE 2

An electrode active material of the formula $NaV(PO_4)_{0.9}OH_{1.3}$, is made as follows. The following sources of Na, V, phosphate ($PO_4$) and OH are provided containing the respective elements in a molar ratio of 1:1:0.9:1.3, respectively.

| | |
|---|---|
| 0.5 mol $V_2O_3$ (mol. wt. 149.9 g/mol) | 75.0 g |
| 0.9 mol $(NH_4)_2HPO_4$ (132 g/mol) | 118.8 g |
| 2 mol NaOH (40.0 g/mol) (excess amount provides for a higher pH) | 80 g |

The overall reaction scheme is as follows. The moles of reactants are stated in the table above.

$(NH_4)_2HPO_4+NaOH+V_2O_3+\rightarrow NaV(PO_4)_{0.9}OH_{1.3}+xNH_3+xH_2O+xCO$

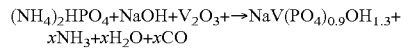

The above stated starting materials are combined, and approximately 2 g of the resulting mixture is premixed with approximately 20 milliliters (mL) of deionized water, transferred and sealed in a Parr acid digestion bomb, which is a Teflon lined stainless steel hydrothermal reaction vessel. The bomb is placed in an oven and heated at a ramp rate of 5° C. per minute to an ultimate temperature of up to 250° C. under autogenous pressure and maintained at this temperature for 12 hours. The reaction vessel is slowly cooled to room temperature and removed from the oven. The product active material is washed repeatedly with deionized water to remove unreacted impurities. Then the product active material is dried in an oven equipped with argon gas flow at 250° C. for up to one hour.

An electrode is made with 84% of the active material, 5% of Super P conductive carbon, and 11-wt % PVdF-HFP copolymer (Elf Atochem) binder. The electrolyte is a 1M $LiPF_6$ solution in ethylene carbonate/dimethyl carbonate (2:1 by weight) while a dried glass fiber filter (Whatman, Grade GF/A) is used as an electrode separator. A commercial crystalline graphite is used as the anode active material. A cell is constructed using the electrode, anode and separator, and then tested.

EXAMPLE 3

An electrode active material of the formula $Li_2Fe_{0.95}Mg_{0.05}(PO_4)_{0.6}F_{2.2}$, is made as follows. The following sources of Li, Fe, Mg, phosphate ($PO_4$) and F are provided containing the respective elements in a molar ratio of 2:0.95:0.05:0.6:2.2, respectively.

| | |
|---|---|
| 0.475 mol $Fe_2O_3$ (159.7 g/mol) | 75.9 g |
| 0.05 mol $Mg(OH)_2$ (58.3 g/mol) | 2.9 g |
| 0.6 mol $(NH_4)_2HPO_4$ (132 g/mol) | 79.2 g |
| 2 mol LiF (25.9 g/mol) | 51.8 g |
| 0.2 mol $NH_4F$ (37.0 g/mol) | 7.4 g |
| 0.5 mol elemental carbon (12 g/mol) (100% excess) | 12 g |

The overall reaction scheme is as follows. The moles of reactants are stated in the table above.

$(NH_4)_2HPO_4+LiF+Mg(OH)_2+Fe_2O_3+C\rightarrow LiFe_{0.95}Mg_{0.05}(PO_4)_{0.6}F_{2.2}+xNH_3+xH_2O+xCO+xCO_2$

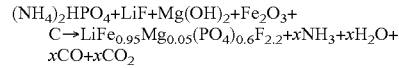

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An electrode is made with 80% of the active material, 10% of Super P conductive carbon, and 10% poly vinylidene difluoride. A cell with that electrode as the cathode and carbon intercalation anode is constructed with an electrolyte comprising 1 M $LiPF_6$ dissolved in 2:1 by weight ethylene carbonate to dimethyl carbonate.

EXAMPLE 4

An electrode active material of the formula $NaV(PO_4)_{0.8}Cl_{1.6}$, is made as follows. The following sources of Li, V, phosphate ($PO_4$) and Cl are provided containing the respective elements in a molar ratio of 1:1:0.8:1.6, respectively.

| | |
|---|---|
| 0.5 mol $V_2O_5$ (mol. wt. 181.9 g/mol) | 91.0 g |
| 0.8 mol $(NH_4)_2HPO_4$ (132 g/mol) | 105.6 g |
| 1.0 mol NaCl (58.4 g/mol) | 58.4 g |
| 0.6 mol $NH_4Cl$ (53.5 g/mol) | 32.1 g |
| 1 mol elemental carbon (12 g/mol) (100% excess) | 24 g |

The overall reaction scheme is as follows. The moles of reactants are stated in the table above.

$(NH_4)_2HPO_4+NaCl+V_2O_5+C\rightarrow NaV(PO_4)_{0.8}Cl_{1.6}+xNH_3+xH_2O+xCO$

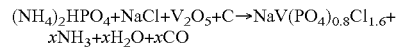

The above starting materials are combined and ball milled to mix the particles. Thereafter, the particle mixture is pelletized. The pelletized mixture is heated for 4-20 hours at 800° C. in an oven in an argon atmosphere. The sample is removed from the oven and cooled.

An electrode is made with 84% of the active material, 5% of Super P conductive carbon, and 11-wt % PVdF-HFP co-polymer (Elf Atochem) binder. The electrolyte comprised a 1M LiPF$_6$ solution in ethylene carbonate/dimethyl carbonate (2:1 by weight) while a dried glass fiber filter (Whatman, Grade GF/A) was used as electrode separator. A commercial crystalline graphite was used as the anode active material. A cell is constructed using the electrode, anode and separator, and then tested.

EXAMPLE 5

An electrode active material of the formula $Li_2Mn_{0.8}Fe_{0.2}(PO_4)_{0.8}OH_{1.6}$, is made as follows. The following sources of Li, Fe, Mn, phosphate (PO$_4$) and OH are provided containing the respective elements in a molar ratio of 2:0.8:0.2:0.8:1.6, respectively.

| | |
|---|---:|
| 0.2 mol FeO (mol. wt. 71.9 g/mol) | 14.4 g |
| 0.8 mol MnCO$_3$ (115 g/mol) | 92 g |
| 0.8 mol (NH$_4$)$_2$HPO$_4$ (132 g/mol) | 105.6 g |
| 2 mol LiOH (24 g/mol) (excess amount provides for a higher pH) | 48 g |

The overall reaction scheme is as follows. The moles of reactants are stated in the table above.

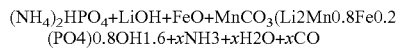
(NH$_4$)$_2$HPO$_4$+LiOH+FeO+MnCO$_3$(Li2Mn0.8Fe0.2 (PO4)0.8OH1.6+xNH3+xH2O+xCO The above stated starting materials are combined, and approximately 2 g of the resulting mixture is premixed with approximately 20 mL of deionized water, transferred and sealed in a Parr acid digestion bomb, which is a Teflon lined stainless steel hydrothermal reaction vessel. The bomb is placed in an oven and heated at a ramp rate of 5° C. per minute to an ultimate temperature of up to 250° C. under autogenous pressure and maintained at this temperature for 12 hours. The reaction vessel is slowly cooled to room temperature and removed from the oven. The product active material is washed repeatedly with deionized water to remove unreacted impurities. Then the product active material is dried in an oven equipped with argon gas flow at 250° C. for up to one hour.

An electrode is made with 80% of the active material, 10% of Super P conductive carbon, and 10% poly vinylidene difluoride. A cell with that electrode as cathode and carbon intercalation anode is constructed with an electrolyte comprising 1 M LiPF6 dissolved in 2:1 by weight ethylene carbonate to dimethyl carbonate is constructed and tested.

EXAMPLE 6

An electrode active material of the formula $Li_2Fe(SiO_4)_{0.9}F_{1.2}$, representative of materials of the general formula $Li_aM_cL_{1-d}Z_{e+d}$, is made as follows. The following sources of Li, Fe, silicate (SiO$_4$) and F are provided containing the respective elements in a molar ratio of 2:1:0.9:1.2, respectively.

| | |
|---|---:|
| 0.4 mol Li$_2$CO$_3$ (mol. wt. 73.9 g/mol) | 29.6 g |
| 0.5 mol Fe$_2$O$_3$ (mol. wt. 159.7 g/mol) | 79.9 g |
| 1 mol SiO$_2$ (mol. wt. 60.1 g/mol) | 60.1 g |
| 1.5 mol LiF (25.9 g/mol) | 38.9 g |
| 0.5 mol elemental carbon (12 g/mol) (100% excess) | 12 g |

The overall reaction scheme is as follows. The moles of reactants are stated in the table above.

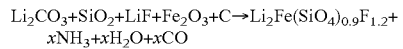
Li$_2$CO$_3$+SiO$_2$+LiF+Fe$_2$O$_3$+C→Li$_2$Fe(SiO$_4$)$_{0.9}$F$_{1.2}$+ xNH$_3$+xH$_2$O+xCO The above starting materials are combined and ball milled to mix the particles. Thereafter, the particle mixture is pelletized. The pelletized mixture is heated for 4-20 hours at 850° C. in an oven in an argon atmosphere. The sample is removed from the oven and cooled. An electrode is made with 80% of the active material, 10% of Super P conductive carbon, and 10% poly vinylidene difluoride. A cell with that electrode as cathode and carbon intercalation anode is constructed with an electrolyte comprising 1 M LiPF$_6$ dissolved in 2:1 by weight ethylene carbonate to dimethyl carbonate is constructed and tested.

EXAMPLE 7

An electrode active material of the formula $LiV(PO_4)_{0.9}F_{1.3}$, representative of materials of the general formula $Li_aV_c(PO_4)_{1-d}F_{e+3d}$, was made as follows. In a first step, a metal phosphate was made by carbothermal reduction of a metal oxide, here exemplified by vanadium pentoxide. The overall reaction scheme of the carbothermal reduction is as follows.

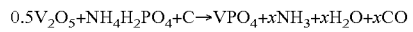
0.5V$_2$O$_5$+NH$_4$H$_2$PO$_4$+C→VPO$_4$+xNH$_3$+xH$_2$O+xCO 1.82 grams of V$_2$O$_5$, 2.64 grams of (NH$_4$)$_2$HPO$_4$, and 0.36 grams of carbon black (Ensaco) were premixed using a mortar and pestle and then pelletized. The pellet was transferred to an oven equipped with a flowing argon atmosphere. The sample was heated at a ramp rate of 2° per minute to an ultimate temperature of 700° C. and maintained at this temperature for sixteen hours. The sample was cooled to room temperature, and then removed from the oven.

In a second step, the vanadium phosphate made in the first step was reacted with additional reactants, according to the following reaction scheme.

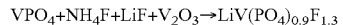
VPO$_4$+NH$_4$F+LiF+V$_2$O$_3$→LiV(PO$_4$)$_{0.9}$F$_{1.3}$

To make LiV(PO$_4$)$_{0.9}$F$_{1.3}$, 1.72 grams VPO$_4$, 0.0346 grams of LiF, and 0.15 grams of NH$_4$F were premixed, pelletized, placed in an oven and heated to an ultimate temperature of 700° C., and maintained at that temperature for one hour, after which the sample was cooled to ambient temperature (about 20° C.) and removed from the oven.

An electrode is made with 84% of the active material, 5% of Super P conductive carbon, and 11-wt % PVdF-HFP co-polymer (Elf Atochem) binder. The electrolyte comprised a 1M LiPF$_6$ solution in ethylene carbonate/dimethyl carbonate (2:1 by weight) while a dried glass fiber filter (Whatman, Grade GF/A) was used as electrode separator. A commercial crystalline graphite was used as the anode active material.

High-resolution electrochemical measurements were performed using the Electrochemical Voltage Spectroscopy (EVS) technique. EVS is a voltage step method, which provides a high-resolution approximation to the open circuit voltage curve for the electrochemical system under investigation. Such technique is known in the art as described by J. Barker in Synth. Met. 28, D217 (1989); Synth. Met. 32, 43

(1989); J. Power Sources, 52, 185 (1994); and Electrochemica Acta, Vol. 40, No. 11, at 1603 (1995).

Figure 3:
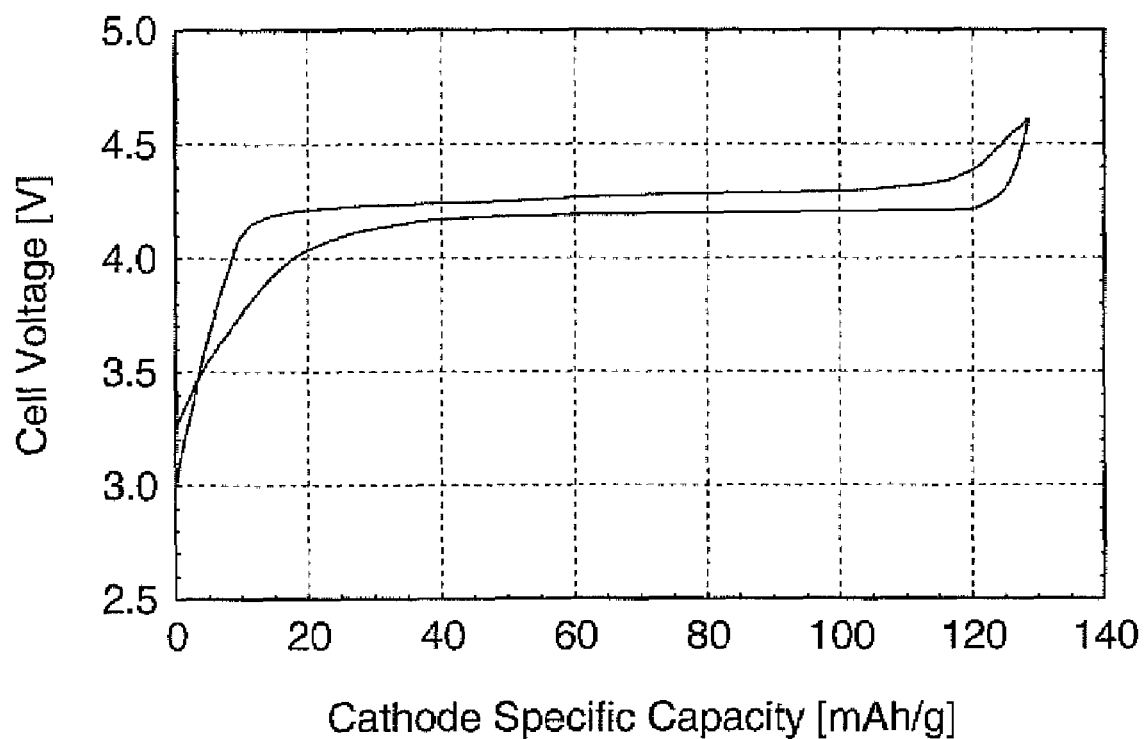
FIG. 3 is a first cycle EVS plot of cathode specific capacity vs. cell voltage for a $Li_xC/1M\ LiPF_6(EC/DMC)/LiV(PO_4)_{0.9}F_{1.3}$ cell.

FIG. 3 shows the first cycle EVS results for the LiV(PO$_4$)$_{0.9}$F$_{1.3}$ material (voltage range: 3.0-4.6 V vs. Li; Critical current density <50 µA/cm$^2$; voltage step=10 mV). The testing was carried out at 23° C. The initial measured open circuit voltage (OCV) was approximately 3.1V vs. Li. Lithium was extracted from the LiV(PO$_4$)$_{0.9}$F$_{1.3}$ material during charging of the cell. A charge equivalent to a material specific capacity of 128 mAh/g was extracted from the cell. The theoretical specific capacity for LiV(PO$_4$)$_{0.9}$F$_{1.3}$ (assuming all the lithium was extracted) is 159 mAh/g. Consequently, the positive electrode active material corresponds to Li$_{1-x}$V(PO$_4$)$_{0.9}$F$_{1.3}$ where x equates to about 0.80, when the active material is charged to about 4.6V vs. Li. When the cell is discharged to approximately 3.00 V a quantity of lithium is re-inserted into the Li$_{1-x}$V(PO$_4$)$_{0.9}$F$_{1.3}$ material. The re-insertion process corresponds to approximately 128 mAh/g, indicating a good reversibility of the LiV(PO$_4$)$_{0.9}$F$_{1.3}$ material. The generally symmetrical nature of the charge-discharge curves further indicates the good reversibility of the system.

Figure 4:
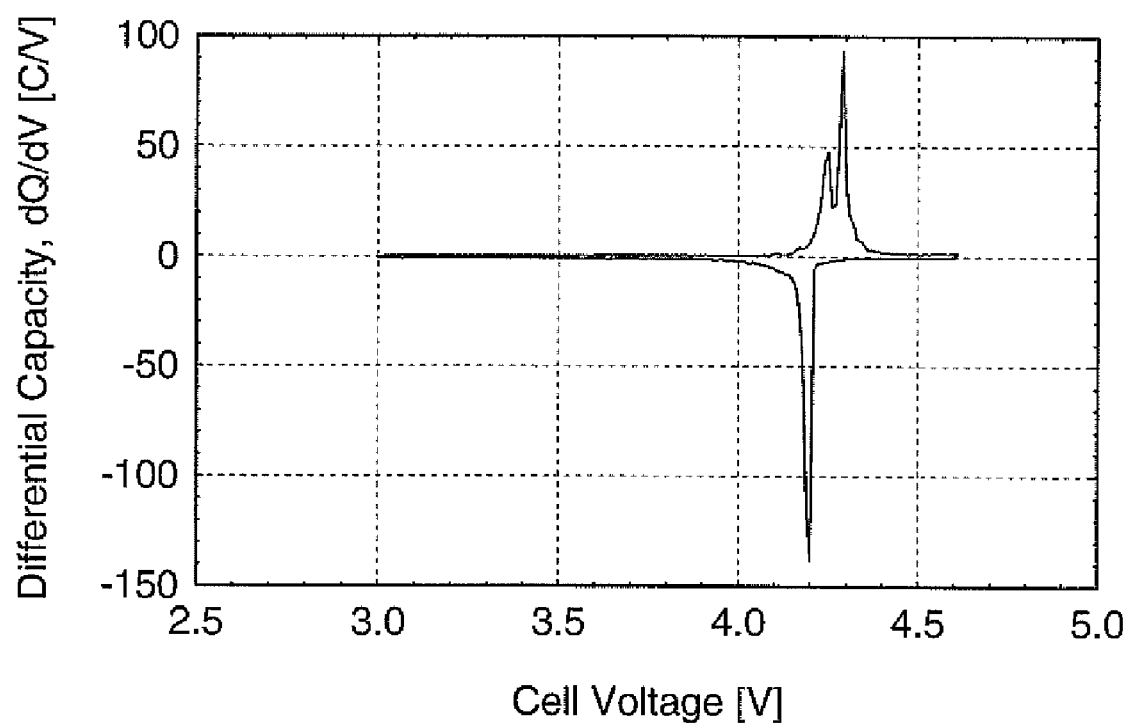
FIG. 4 is an EVS differential capacity plot for the $Li_xC/1M\ LiPF_6(EC/DMC)/LiV(PO_4)_{0.9}F_{1.3}$ cell.

FIG. 4 is an EVS differential capacity plot based on FIG. 3. As can be seen from FIG. 4, the relatively symmetrical nature of the peaks indicates good electrical reversibility. There are small peak separations (charge/discharge), and good correspondence between peaks above and below the zero axis. There are essentially no peaks that can be related to irreversible reactions, since peaks above the axis (cell charge) have corresponding peaks below the axis (cell discharge), and there is very little separation between the peaks above and below the axis. This shows that the LiV(PO$_4$)$_{0.9}$F$_{1.3}$ is a suitable electrode active material.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A battery, comprising:
a positive electrode comprising a compound represented by the general formula:

$$A_{a+b}M_CL_{1-d}Z_{e+b+(V^L)(d)},$$

wherein:
(i) A is selected from the group consisting of elements from Group I of the Periodic Table, and mixtures thereof;
(ii) M includes at least one redox active element;
(iii) L is selected from the group consisting of X'[O$_{4-x}$,Y'$_x$], X'[O$_{4-y}$,Y'$_{2y}$], X"S$_4$, [X$_z$''',X'$_{1-z}$]O$_4$, and mixtures thereof, wherein:
(a) X' and X''' are each independently selected from the group consisting of P, As, Sb, Si, Ge, V, S, and mixtures thereof;
(b) X" is selected from the group consisting of P, As, Sb, Si, Ge, V, and mixtures thereof;
(c) Y' is selected from the group consisting of halogens selected from Group 17 of the Periodic Table, S, N, and mixtures thereof;
(d) 0≦x≦3,0≦y≦2,0≦z≦1;
(iv) Z is selected from the group consisting of a hydroxyl (OH), halogens selected from Group 17 of the Periodic Table, and mixtures thereof, and V$^L$ is the oxidation state of composition variable L; and
(v) a, b and e≧0,0<d<1, and c>0;

(vi) wherein A, M, L, Z, a, b, c, d, e, x, y, and z are selected so as to maintain electroneutrality of the electrode active material in its nascent state;
the battery further comprising a negative electrode; and an electrolyte.

2. The battery of claim 1, wherein A is Li.

3. The battery of claim 1, wherein M is selected from the group consisting of Ti$^{2+}$, V$^{2+}$, Cr$^{2+}$, Mn$^{2+}$, Fe$^{2+}$, Co$^{2+}$, Ni$^{2+}$, Cu$^{2+}$, Mo$^{2+}$, Si$^{2+}$, Sn$^{2+}$, and Pb$^{2+}$.

4. The battery of claim 1, wherein M is selected from the group consisting of Ti$^{3+}$, V$^{3+}$, Cr3$^+$, Mn$^{3+}$, Fe$^{3+}$, Co$^{3+}$, Ni$^{3+}$, Mo$^{3+}$, and Nb$^{3+}$.

5. The battery of claim 1, wherein M=MI$_n$MII$_o$, 0 <o+n≦3 and 0<o,n, wherein MI and MII are each independently selected from the group consisting of redox active elements and non-redox active elements, wherein at least one of MI and MII is redox active.

6. The battery of claim 5, wherein MI and MII are both redox active.

7. The battery of claim 5, wherein MI is substituted by MII by isocharge substitution.

8. The battery of claim 7, wherein M=MI$_{n-p}$MII$_o$, and o=p.

9. The battery of claim 7, wherein M=MI$_{n-p}$MII$_o$, and o≠p.

10. The battery of claim 7, wherein MI is selected from the group consisting of Ti$^{2+}$, V$^{2+}$, Cr$^{2+}$, Mn$^{2+}$, Fe$^{2+}$, Co$^{2+}$, Ni$^+$, Cu$^{2+}$, Mo$^{2+}$, Si$^{2+}$, Sn$^{2+}$, Pb$^{2+}$, and mixtures thereof, and MII is selected from the group consisting of Be$^{2+}$, Mg$^{2+}$, Ca$^{2+}$, Sr$^{2+}$, Ba$^{2+}$, Zn$^{2+}$, Cd$^{2+}$, Ge$^{2+}$, and mixtures thereof.

11. The battery of claim 7, wherein MI is selected from the group consisting of Ti$^{3+}$, V$^{3+}$, Cr$^{3+}$, Fe$^{3+}$, Co$^{3+}$, Ni$^{3+}$, Mo$^{3+}$, Nb$^{3+}$, and mixtures thereof, and MII is selected from the group consisting of Sc$^{3+}$, Y$^{3+}$, B$^{3+}$, Al$^{3+}$, Ga$^{3+}$, In$^{3+}$, and mixtures thereof.

12. The battery of claim 5, wherein MI is substituted by MII by aliovalent substitution.

13. The battery of claim 12, wherein M=MI$_{n-o}$MII$_o$.

14. The battery of claim 12, wherein $$M = MI_{n-\frac{o}{V^{MI}}} MII_{\frac{o}{V^{MII}}},$$

wherein V$^{MI}$ is the oxidation state of MI, and V$^{MII}$ is the oxidation state of MII.

15. The battery of claim 14, wherein MI is selected from the group consisting of Ti$^{2+}$, V$^{2+}$, Cr$^{2+}$, Mn$^{2+}$, Fe$^{2+}$, Co$^{2+}$, Ni$^{2+}$, Cu$^{2+}$, Mo$^{2+}$Si$^{2+}$, Sn$^{2+}$, Pb$^{2+}$, and mixtures thereof, and MII is selected from the group consisting of Sc$^{3+}$, Y$^{3+}$, B$^{3+}$, Al$^{3+}$, Ga$^{3+}$, In$^{3+}$, and mixtures thereof.

16. The battery of claim 14, wherein MI is selected from the group consisting of Ti$^{2+}$, Cr$^{2+}$, Mn$^{2+}$, Fe$^{2+}$, Co$^{2+}$, Ni$^{2+}$, Cu$^{2+}$, Mo$^{2+}$, Si$^{2+}$, Sn$^{2+}$, Pb$^{2+}$, and mixtures thereof, and MII is selected from the group consisting of alkali metals, Cu$^{1+}$, Ag$^{1+}$, and mixtures thereof.

17. The battery of claim 14, wherein MI is selected from the group consisting of Ti$^{3+}$, V$^{3+}$, Cr$^{3+}$, Mn$^{3+}$, Fe$^{3+}$, Co$^{3+}$, Ni$^{3+}$, Mo$^{3+}$, Nb$^{3+}$, and mixtures thereof, and MII is selected from the group consisting of Be$^{2+}$, Mg$^{2+}$, Ca$^{2+}$, Sr$^{2+}$, Ba$^{2+}$, Zn$^{2+}$, Cd$^{2+}$, Ge$^{2+}$, and mixtures thereof.

18. The battery of claim 14, wherein MI is selected from the group consisting of Ti$^{3+}$, V$^{3+}$, Cr$^{3+}$, Mn$^{3+}$, Fe$^{3+}$, Co$^{3+}$, Ni$^{3+}$, Mo$^{3+}$, Nb$^{3+}$, and mixtures thereof MII is selected from the group consisting of alkali metals, Cu$^{1+}$, Ag$^{1+}$, and mixtures thereof.

19. The battery of claim 1, wherein $M=M1_qM2_rM3_s$, wherein:
(a) M1 is a redox active element with a 2+ oxidation state;
(b) M2 is selected from the group consisting of redox and non-redox active elements with a 1+ oxidation state;
(c) M3 is selected from the group consisting of redox and non-redox active elements with a 3+ oxidation state; and
(d) at least one of p, q and r is greater than 0, and at least one of M1, M2, and M3 is redox active.

20. The battery of claim 1, wherein $XY_4$ is selected from the group consisting of $PO_4$, $AsO_4$, $SbO_4$, $SiO_4$, $CeO_4$, $VO_4$, $SO_4$, and mixtures thereof.

21. The battery of claim 20, wherein $XY_4$ is $PO_4$.

22. The battery of claim 1, wherein the electrode active material is represented by the general formula:

$$Li_aM_cL_{1-d}Z_{e+d(V^L)},$$

wherein:
(i) $0<a\leq 4$, $0<c\leq 2$, $0<d<1$ and $0\leq e\leq 1$;
(ii) composition variables M and Z are as described herein above;
(iii) L is $XO_4$, wherein X is selected from the group consisting of P, As, Sb, Si, Ge, V, S and mixtures thereof;
(iv) $V^L$ is the oxidation state of composition variable L; and
(v) M, L, Z, a, c, d and e are selected so as to maintain electroneutrality of the electrode active material in its nascent state.

23. The battery of claim 1, wherein the electrode active material is represented by the general formula:

$$Li_aM_c(PO_4)_{1-d}Z_{e+3d},$$

wherein:
(i) $0<a\leq 3$, $0<c\leq 2$, $0<d<1$, and $0\leq e\leq 6$;
(ii) composition variables M and Z are as described herein above; and
(iii) M, Z, a, c, d and e are selected so as to maintain electroneutrality of the electrode active material in its nascent state.

24. The battery of claim 1, wherein the electrode active material is represented by the general formula:

$$Li_aV_c(PO_4)_{1-d}F_{e+3d},$$

wherein:
(i) $0<a\leq 5$, $0<c\leq 1$, $0<d<1$, and $0<e\leq a$; and
(ii) a, c, d and e are selected so as to maintain electroneutrality of the electrode active material in its nascent state.

* * * * *